Jan. 12, 1932.                F. SLUSHER                1,841,260
           METHOD AND APPARATUS FOR MAKING TIRE BEAD CORES
                   Filed July 18, 1927        6 Sheets-Sheet 1

Inventor,
Frank Slusher
By Pierson, Eakin & Avery
Attys.

Jan. 12, 1932. F. SLUSHER 1,841,260
METHOD AND APPARATUS FOR MAKING TIRE BEAD CORES
Filed July 18, 1927 6 Sheets-Sheet 2

Inventor;
Frank Slusher
By Pierson, Eakin & Avery
Attys.

Jan. 12, 1932.　　　　F. SLUSHER　　　　1,841,260
METHOD AND APPARATUS FOR MAKING TIRE BEAD CORES
Filed July 18, 1927　　　6 Sheets-Sheet 3

Fig. 7.

Inventor
Frank Slusher
By Pierson, Erskin & Avery
Attys.

Jan. 12, 1932.  F. SLUSHER  1,841,260
METHOD AND APPARATUS FOR MAKING TIRE BEAD CORES
Filed July 18, 1927  6 Sheets-Sheet 6

Inventor
Frank Slusher
By Pierson, Eskin & Avery
Attys.

Patented Jan. 12, 1932

1,841,260

UNITED STATES PATENT OFFICE

FRANK SLUSHER, OF AKRON, OHIO, ASSIGNOR TO THE B. F. GOODRICH COMPANY, OF NEW YORK, N. Y., A CORPORATION OF NEW YORK

METHOD AND APPARATUS FOR MAKING TIRE-BEAD CORES

Application filed July 18, 1927. Serial No. 206,554.

This invention relates to procedure and apparatus for making tire-bead cores wherein a length of strand material such as wire tape, preferably coated with a tacky rubber compound, is wound upon itself in a plurality of convolutions to form a ring.

My chief objects are to provide for uniformity and accuracy of size in bead cores or similar articles of this character; to provide economy of labor and materials; to provide for larger production without great equipment expense; to provide automatic apparatus for work of this character; to provide apparatus readily adapted to produce bead cores of different sizes and bead cores of different numbers of convolutions or different lengths of overlap of the two end portions of the wound length of material; to provide for the continuous feed of a strip of material to a severing position and the automatic severing and winding of successive lengths of the material without stoppage of the feed of the supply strip, so that the supply strip may be continuously drawn through a coating means such as a rubber extruding machine without such inconveniences as result from stoppage of the strip in coating means of that character; and to provide a compact, dual machine adapted for simultaneous operation upon a plurality of continuous strips to produce a correspondingly large number of the bead cores in a given time.

General description

The preferred apparatus here shown comprises means for constantly feeding forward two continuous strips of the bead core material; means for severing successive lengths from each of the strips of material without stopping the feed of the residue; means for advancing each severed length more rapidly than the residue so that a time interval is provided between the completion of the winding of each length and the arrival of the leading end of the next length at the winding position; and means for receiving the successive lengths and winding them into successive rings at the winding position and for releasing the wound rings so that they drop from the apparatus.

The means for severing the successive lengths from the continuous strips comprises a stationary shear blade member past which the two strips are simultaneously fed and a rotating shear-blade arm is provided for coaction with the stationary shear blade member for severing the strips at determinate time intervals.

Provision is made for so regulating the speed of the means for feeding the strips to the severing means or cutter as determinately to vary the lengths of the units cut from the strips, according to the character of the bead cores to be formed.

A dual winding device is provided, comprising a pair of coaxial, cylindrical winding forms each associated with and axially movable with relation to a pair of work confining members formed with annular faces extending about the winding form and adapted therewith to define an annular tape-receiving space or groove.

Means are provided for conveying the severed lengths of tape from the cutter to the winding forms and there projecting their leading ends into the work-receiving grooves, and a circumferential series of presser rollers is provided for each winding form to hold the leading ends of the tape lengths in the grooves and thus cause them to be carried forward by the winding forms, the presser rollers also being adapted to press together the successive convolutions of the adhesive tapes and thus to unify them in the form of a wound annulus.

Provision is made for so moving the winding forms and their work-retaining members with relation to each other after each bead core is wound as to separate the work-retaining members and withdraw the winding form into one of them so that the wound bead core is pushed off of the winding form by the work-retaining member into which it is drawn, the bead core thus being permitted to fall from the winding device and the winding forms and work-retaining member then being brought back to work-receiving position for the reception of the succeeding lengths of material.

*Strip feeding and cutting devices*

Figures 9, 10:
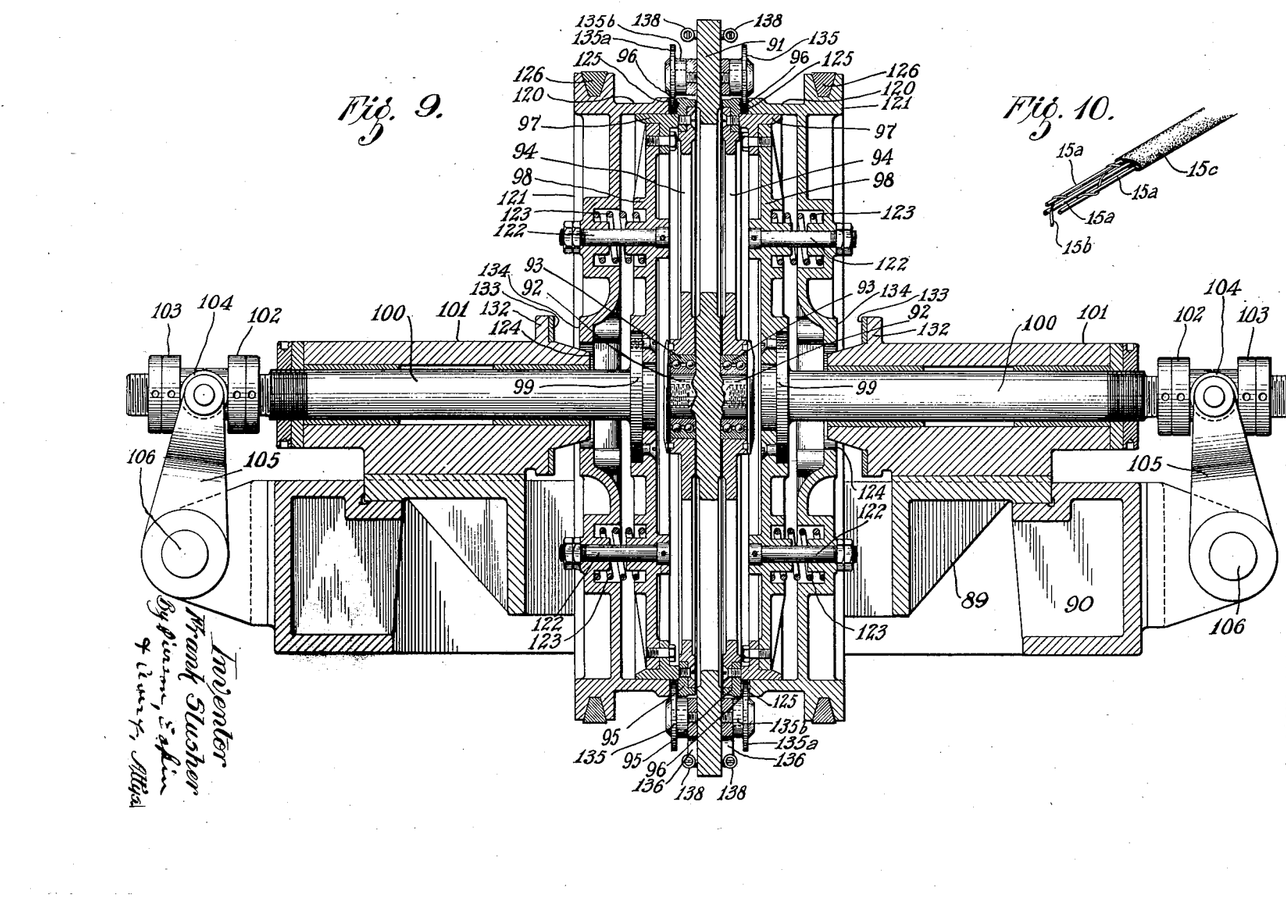
Fig. 9 is a vertical section taken at the axis of the strip winding devices.
Fig. 10 is a perspective view of the rubber coated wire tape which is preferably employed as the material for the bead cores.

Referring to Figs. 1 to 6 of the drawings, the strip feeding and cutting devices comprise a series of peripherally grooved strip driving rolls 10, 11, 12, 13, 14 arranged in staggered relation for feeding in a sinuous path two strips or tapes 15, 15 of ring-forming material, each preferably consisting of warp wires 15ª, 15ª, a weft wire 15ᵇ and a tacky rubber cover 15ᶜ (Fig. 10). The rolls are adapted to draw the strips from a suitable source of supply which preferably is a rubber extruding machine in which they are coated, the staggered relation of the rolls being such as to provide adequate frictional driving contact of the rolls with the tapes.

The terminal roll of the series, 14, has associated therewith a pair of driven presser disks 16, 16 (Figs. 1 and 6) adapted to press the tapes 15 in the respective grooves of the roll 14 and to coact with the roll 14 as feed rolls to feed the tapes forward through a guide funnel 17 and through respective apertures in a shear-blade member 18 (Figs. 1 and 4) mounted upon the machine frame.

The respective shafts of the feed rolls numbered 10 to 14 are numbered 19 to 23 and have secured thereon respective entrained gears numbered 24 to 28, and for driving them the gear 24 is meshed with a gear 29 secured upon a shaft 30 (Figs. 1 and 2) which has splined thereon a gear 31 mounted between the hubs of a gear-shift fork 32 which has journaled between the outer ends of its arms and meshed with the gear 31 is a gear 33 which is adapted to be meshed in one or another stage of a change-gear 34 secured upon a shaft 35 which has drive connection, through a sprocket chain 36, a variable speed device 37 and a multiple belt pulley 38, with a motor 39, the change-gear 34 being adapted to provide for major variations of speed and the variable speed device 37 being adapted for the minor, perfecting adjustments of speed.

The presser disks 16, 16 are secured upon a shaft 40 journaled in the outer end of a bell crank lever 41 which is fulcrumed on a shaft 42 and has its other arm connected with the machine frame by a pull spring 43 for holding the disks against the work. For driving the disks the shaft 40 has secured thereon a gear 44 meshed with a gear 45 which is secured upon the shaft 42 and the shaft 42 has drive connection, through a sprocket chain 46, with the shaft 23 of the feed roll 14.

Figure 1:
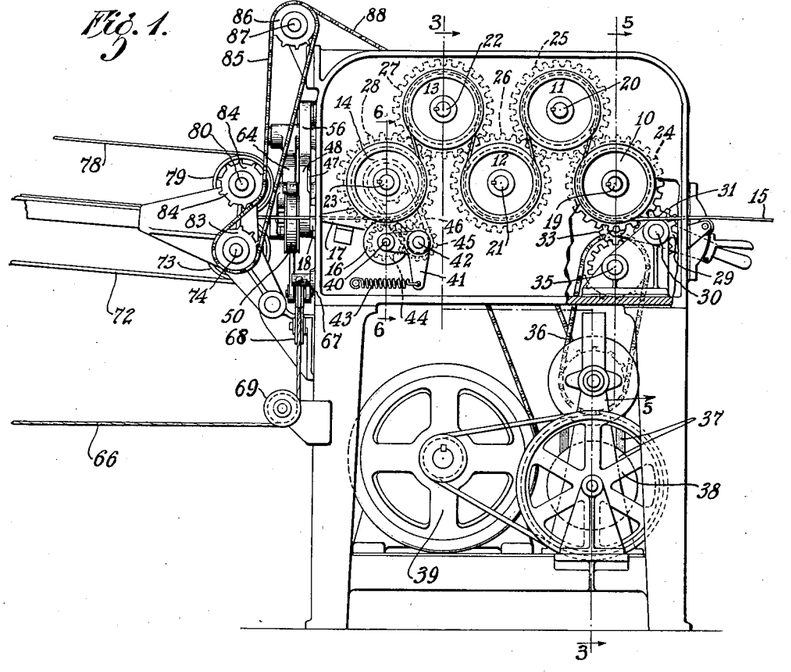
Fig. 1 is a side elevation with parts broken away of a strip feeding means and associated devices including a strip cutter, embodying and adapted to carry out my invention in its preferred form.
Figure 2:
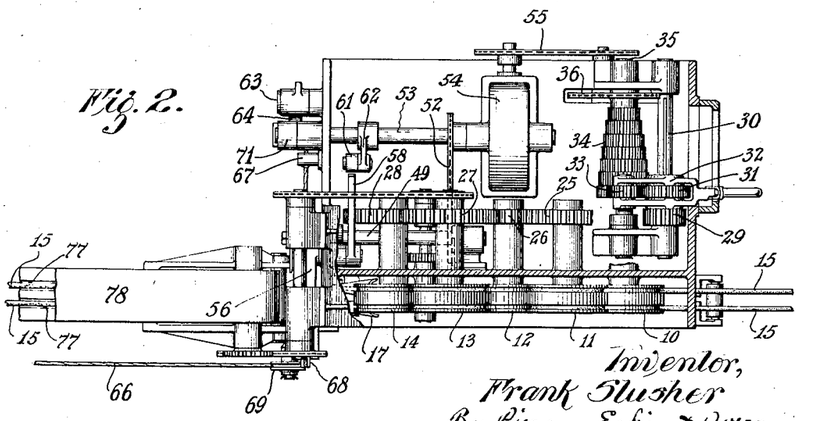
Fig. 2 is a plan view of the same with parts broken away.
Figure 3:
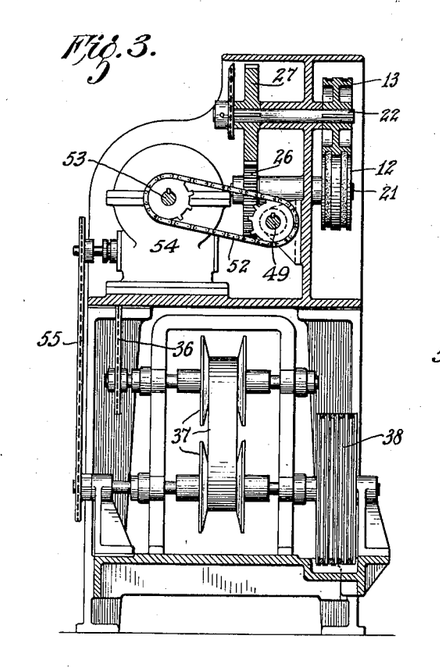
Fig. 3 is a section on line 3—3 of Fig. 1.
Figure 4:
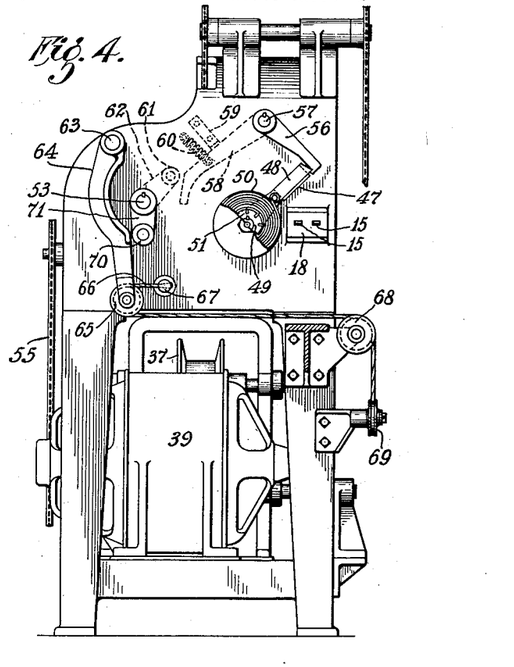
Fig. 4 is an end view of the apparatus of Fig. 1, from the left of Fig. 1, parts being sectioned and parts broken away.
Figure 5:
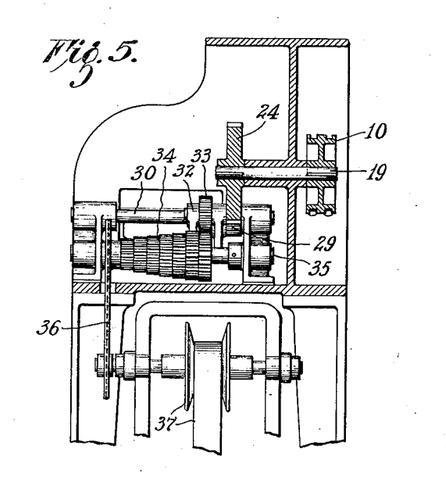
Fig. 5 is a section on line 5—5 of Fig. 1.
Figure 6:
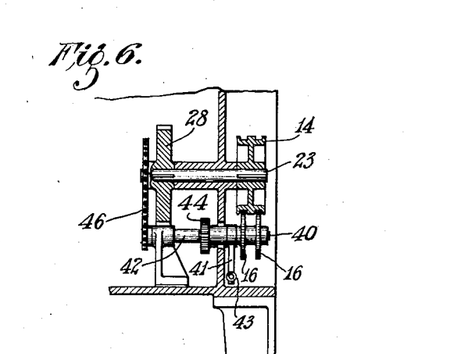
Fig. 6 is a section on line 6—6 of Fig. 1.

For coacting with the shear blade member 18 to sever the tapes 15, a shear blade 47 is secured upon a rotary arm 48 loosely mounted upon a shaft 49 but urged to rotate therewith by a coiled spring 50 interposed operatively between the shaft 49 and the arm 48 and provided with an adjusting-ratchet device 51 (Fig. 4). The shaft 49 has fixed-ratio drive connection to the motor through a sprocket chain 52 (Fig. 3), shaft 53, worm gear reduction device 54 and a sprocket chain 55 which connects with that side of the variable speed device 37 which is nearest to the motor.

For detaining the shear-blade arm 48 at a determinate position in each of its revolutions and then releasing it so that it will be swung violently past the shear-blade member 18 by the spring 50, a latching arm 56 adapted to engage the outer end of the shear-blade arm 48 is secured upon a rock shaft 57 which is provided within the machine frame with a cam arm 58 urged against a stop 59 by a pull spring 60 and extending into the path of a cam roller 61 mounted upon the outer end of an arm 62 which is secured upon the shaft 53, the arm 62 being so timed that the latching arm 56 will be lifted momentarily at a time when, in the revolution of the shaft 49, the coil spring 50 will be so stressed by the detention of the arm 48 as to impel the arm 48 rapidly past the shear blade member 18, thus assuring a clean severing of the strips 15 and an appropriately quick passage of the arm 48 from in front of the leading ends of the residues of the strips, so that their continuous feeding movement is not interfered with.

Fulcrumed on the machine frame at 63 is a cam lever 64 having journaled in its forked outer end a pulley 65 mounted in a loop of a cable 66 which has one end anchored to a stud 67 projecting from the machine frame, the cable extending from the pulley 65, over guide pulleys 68 and 69, to the winding devices, for actuating the latter in timed relation to the severing of the strips by the shear members 47 and 18, the cam arm 64 being adapted to be actuated by a cam roller 70 mounted on the end of an arm 71 which is secured upon the shaft 53.

For receiving the leading ends of the residues of the strips 15 after each severing operation and for drawing them forward and subsequently feeding them as severed lengths to the winding devices a lower endless belt 72 is mounted upon an end roll 73 (Fig. 1) secured upon a shaft 74 which is journaled in the framing adjacent the cutting device, and the belt 72 at its delivery end is mounted upon an end roll 75 (Figs. 7 and 8) upon a shaft 76 journaled in suitable framing adjacent the winding devices. The lower belt 72 is formed with parallel grooves 77, 77 (Figs. 8 and 11) to accommodate the respective strips 15. For holding the strips down in the said grooves an upper endless belt 78 is mounted upon an end roll 79 (Fig. 1) secured upon a shaft 80 journaled in the framing adjacent the cutting device, the delivery end of the belt 78 being mounted upon an end roll 81 which is secured upon a shaft 82 journaled in the framing adjacent the winding devices.

For driving the endless belts 72 and 78, preferably at a speed somewhat faster than the feeding speed of the rolls 10 to 14, the shafts 74 and 80 of the end rolls of the belts at their receiving end (Fig. 1) have secured thereon respective sprockets 83, 84 meshed with a sprocket chain 85 running upon a sprocket 86 which is secured upon a shaft 87 having drive connection, through a sprocket chain 88, with a sprocket secured upon the shaft 22 of the feed roll 13.

*Winding devices*

The winding devices are mounted upon a removable bridge member 89 which is set upon a table structure 90 (Figs. 7, 8, 9 and 11) and preferably is secured detachably thereto. The bridge member 89 has formed integrally therewith a vertical, medial web member 91 which is formed at its center with stub shafts 92, 92 projecting from its respective faces. Journaled upon each stub shaft, upon a roller bearing 93, is a spider member 94 provided at its outer periphery with an annular work-retaining plate 95 having on its side away from the web member 91 an annular work-engaging face 96 disposed in a plane at right angles to its axis. At the inner margin of the said face 96 the plate 95 is slightly recessed for the reception of a winding form 97 having a cylindrical outer work-receiving face, the winding form 97 being mounted upon a spider member 98 detachably secured upon a head 99 which is formed upon the end of a shaft 100 slidably journaled in a long bearing 101 secured upon the bridge member 89. The outer end of each of the shafts 100 has adjustably mounted thereon a pair of flanged collars 102, 103 defining an annular channel for a pair of rollers 104, 104 journaled upon the arms of a shipper-fork 105 secured upon one end of a rock shaft 106 which is journaled in brackets projecting from the machine frame, each rock shaft 106 having secured upon the other end thereof (see Figs. 7 and 11) a rocker arm 107 which is connected by a link 108 with a cross-head 109 secured upon the upper end of a piston rod 110 of a fluid pressure cylinder 111 mounted upon the side of the table member 90, the winding forms 97 thus being adapted to be simultaneously moved axially away from the work retaining members 95, through the connections just described, by upward movement of the piston rod 110, and to be brought back into association with the work-retaining members 95 by downward movement of the piston rod 110. For guiding the cross-head 109 and piston rod 110 and limiting their upward movement, the cross-head 109 is provided with two guide and stop rods 112, 112 slidably extending through guide apertures in a flanged portion 113 of a bridge member 114 of which the cylinder 111 is formed as an integral part, and each of the rods 112 is provided at its lower end with a stop nut 115 and a lock nut 116.

For actuating the cylinder 111 in suitable timed relation to the strip severing device the cylinder is provided with a 4-way valve 117 (Figs. 7 and 11) having the cable 66 secured to its lever 118, and a pull spring 119 (Fig. 7) connects the valve lever 118 with the framing to urge the valve lever toward a position such that the upper end of the cylinder 111 is charged, with the winding forms 97 in winding position, except at such times as the cam lever 64 (see Fig. 4) is held in valve-reversing position by engagement of the cam roller 70 therewith.

Telescoped upon each of the winding form members 97 is a laterally disposed annular flange 120 formed upon a belt pulley member 121 which is retained with its flange 120 in telescoped relation upon the form member 97 by circumferentially spaced bolts such as the bolts 122, 122 tightly fitted in apertures formed in the spider member 98 upon which the winding form is mounted and slidably extending through apertures formed in the belt pulley member 121. The spider member 98 and the belt pulley member 121 are formed with spring sockets surrounding the bolt holes and a compression spring 123 is mounted in each pair of sockets for urging the belt pulley member 121 away from the spider member 98, the belt pulley member being formed with a large axial aperture 124 so that it loosely surrounds the shaft 100 and is supported only by the bolts 122 and its telescopic association with the winding form 97. The flange 120 of the belt pulley member 121 is formed with a work-engaging annular face 125 perpendicular to its axis and adapted in association with the cylindrical face of the winding form 97 and with the work-engaging face 96 of the ring 95, to define an annular work receiving groove for the winding of the tape 15.

For driving each winding form assembly the belt pulley member 121 of the assembly is formed on its outer periphery with a groove for a V-belt 126 running from a pulley 127 secured upon the same shaft 128 (Figs. 7 and 11) with a larger belt pulley 129 having multiple belt connection, through belts 130, 130, with a motor 131.

Each of the bearings 101 is tapered at its inner end so that it may extend within the axial aperture 124 of the belt pulley member 121, to give the shaft 100 a wide bearing support and at the base of the taper each bearing 101 is formed with an annular flange 132 provided with an annular wear plate 133 adapted to be abutted by an annular finished surface 134 formed on a central boss of the belt pulley member 121, to stop the belt pulley member in an axial direction while permitting it to continue to rotate, when the winding-form member is moved away from the central web portion 91 of the bridge member 89 through the actuation of the shipper-fork 105, so that further outward movement of the spider member 98 and its winding form 97, overcoming the compression springs 123, will carry the winding form 97 completely within the annular flange 120 of the pulley member 121 and thus cause the winding form to withdraw from within the wound bead core, the latter being held by the annular face 125 of the flange 120, so that in effect the flange 120 pushes the bead core axially off of the winding form, and the retraction of the winding form from the work-retaining ring 95 permits the bead core to fall from the winding device.

For pressing the tape 15 against the winding form 97, within the groove defined by the winding form and the members 95 and 120, a closely spaced circumferentially series of presser rolls 135, 135 are journaled upon tangentially disposed arms of respective bell crank levers 136, 136 which are fulcrumed respectively at 137, 137 upon the web portion 91 of the bridge member 89 and have their other arms so connected to the said web portion by pull springs 138, 138 as to urge the presser rollers 135 toward the axis of the winding devices. Each of the presser rollers 135 is formed with a flange portion 135$^a$ adapted to run in the work receiving groove of the winding form assembly to press the work therein and with a hub portion 135$^b$ adapted to run upon the outer face of the work-retaining ring 95 when the winding form 97 is retracted, to prevent the presser rollers from being held so far inward by the springs 138 as to interfere with the return movement of the winding form 97.

For guiding the tapes 15 into the work-receiving groove of each winding-form assembly a funnel structure 140 (Fig. 8) is mounted in a bracket such as the bracket 141 secured to the web member 91, the funnel structure 140 being disposed substantially in tangential relation to the winding form and terminating at its narrow end closely adjacent the bight of one of the presser rollers 135 and the guiding form 97.

The relatively large receiving end of the funnel structure 140 is so cut away that its mouth is approximately complemental to the adjacent faces of a pair of feed rolls 142, 143 which are mounted between the delivery terminals of the pair of endless belts 72, 78 and are adapted to receive the tapes 15 from the endless belts through a funnel 144 mounted upon the framing and extending from the delivery bight of the endless belts to the receiving bight of the feed rolls 142, 143.

The lower feed roll 143 is formed as the outer member of a ball-clutch structure of which the inner member 145 is secured upon a shaft 146 which is journaled between the outer ends of a pair of arms 147, 148 which are secured upon a shaft 149 journaled in the framing, the shaft 149 having secured thereon an arm 150 (Fig. 7) provided with a bolt 151 by which it is secured to the framing for holding the shaft 149 in proper angular position.

Figure 7:
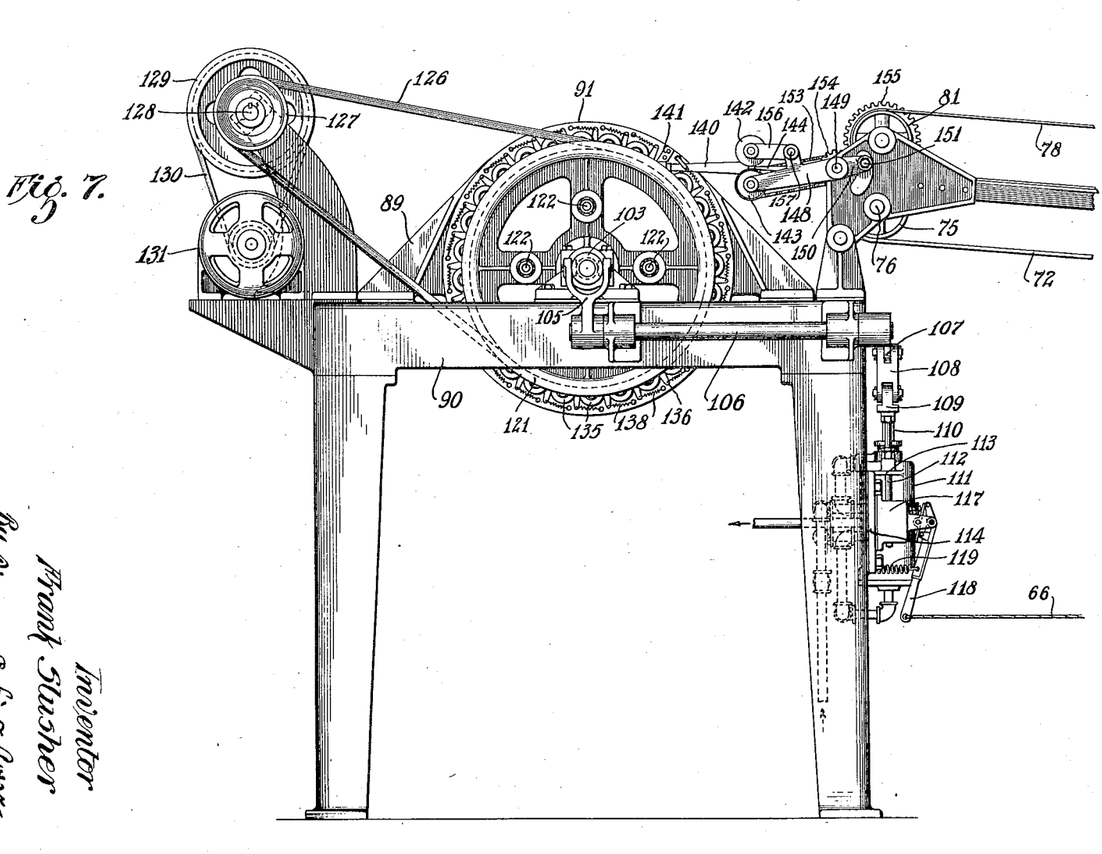
Fig. 7 is a side elevation, from the same view-point as that of Fig. 1, of strip feeding and winding devices constituting parts of the apparatus.
Figure 8:
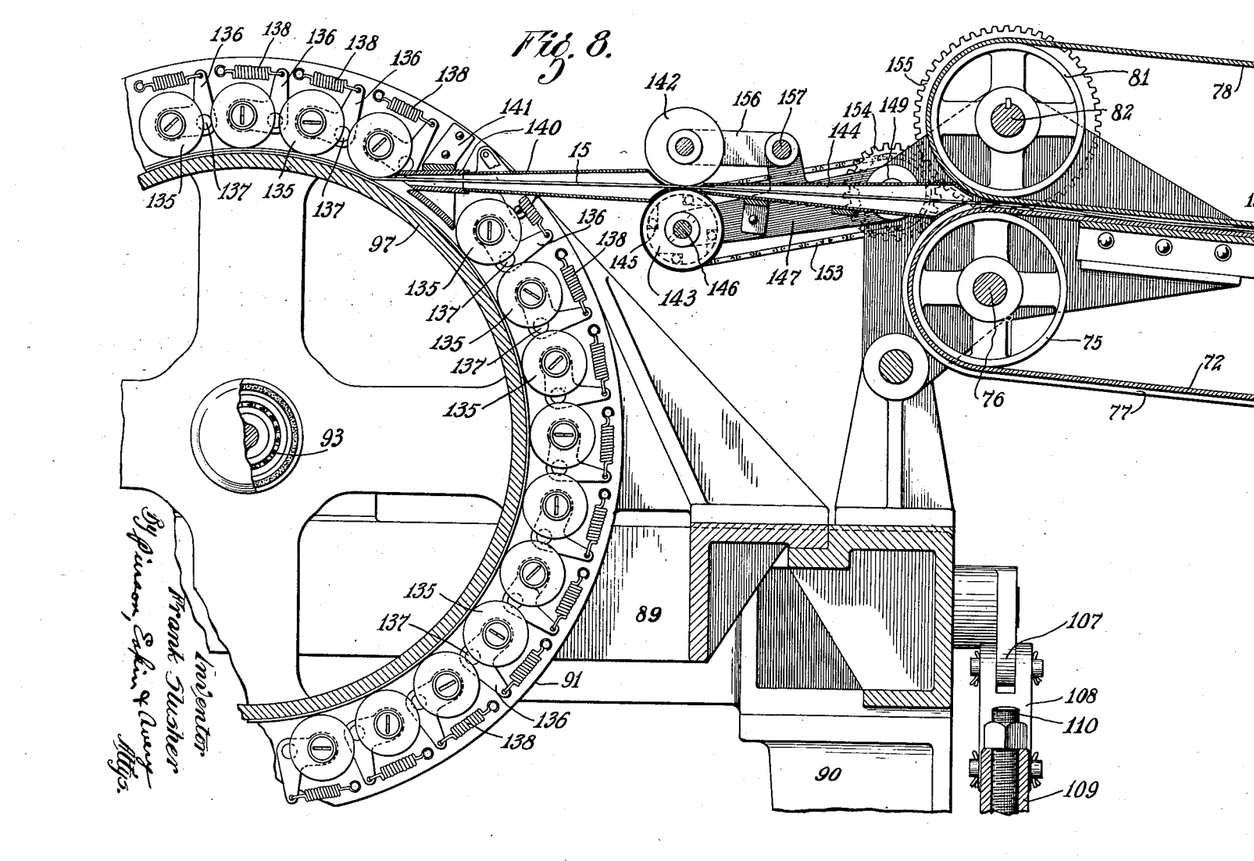
Fig. 8 is a vertical section of the devices shown in Fig. 7.

For driving the lower feed roll 143, through the ball clutch structure, at a peripheral speed slightly less than that of the winding form 97, the shaft 146 has drive connection, through a sprocket chain 153 and gears 154, 155, with the delivery end roll of the upper endless belt 78, the ball-clutch structure permitting the tape to run more rapidly between the feed rolls 142, 143 when the tape has acquired feeding engagement with the winding form 97. The upper feed roll 142 is only an idler weight roll and is journaled between arms 156, 156 hinged at 157 upon brackets rising from the arms 147, 148.

*Operation*

In the operation of the apparatus, the belt pulley members 121 and winding form structures 97, 98 being continuously driven by the motor 131 the work-retaining rings 95 being driven with the winding forms by frictional engagement therewith, the tapes 15 being threaded through the series of feed rolls 10—14 and through the apertures in the stationary shear blade member 18, and the strip feeding and cutting device being continuously driven by the motor 39 (Fig. 1), the rotating shear blade 47 at determinate intervals of time is momentarily detained by the latching arm 56, in each revolution of the shaft 49, and is then released by the cam roller 61 engaging the arm 58 and is impelled by the spring 50 rapidly past the stationary shear blade member 18, severing the strips 15 at the delivery face of the member 18 and instantly passing from in front of the leading ends of the residues of the tapes.

In suitable time relation to give the desired length in the units severed from the continuous tapes, the feeding devices propel the continuous tapes through the stationary shear blade member 18, the leading ends of the continuous strips, after each severing operation, being received in the grooves 77 of the lower endless belt.

As each pair of tape lengths are severed from the continuous strips they are carried forward between the endless belts 72 and 78 at a slow speed as compared with the peripheral speed of the winding forms 97, but preferably somewhat faster than the feeding of the continuous strips, to step them ahead of the latter, and the leading ends of the severed lengths are projected through the funnels 144, to the feed rolls 142, 143, which further project them through the funnels 140 so that they pass onto the winding forms 97 under the adjacent presser rollers 135. As soon as the leading end portion of the tape has secured feeding engagement between the winding form and one or more of the presser rollers 135 the tape is rapidly drawn onto the winding form, the feed roll 143 running more rapidly than the inner member of its ball clutch structure, so that the tape lengths are quickly withdrawn from between the endless belts 72, 78, thus being further stepped ahead of the following lengths of tape.

Figures 11, 12:
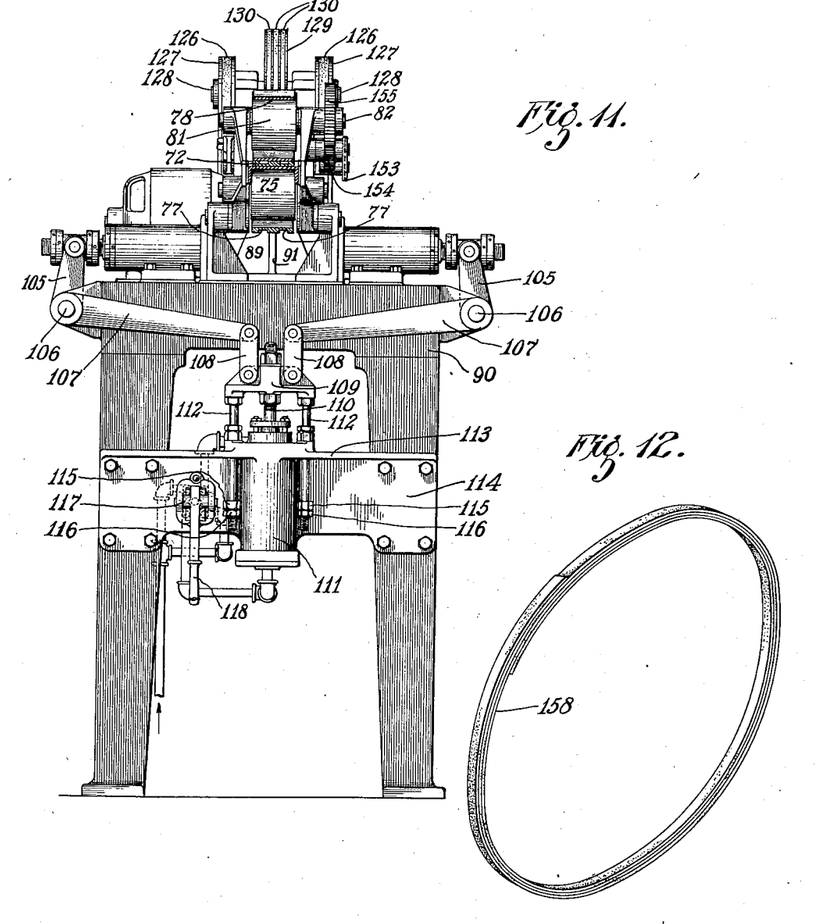
Fig. 11 is an elevation of the strip winding devices, from the right of Fig. 7, parts being shown in section.
Fig. 12 is a perspective view of the finshed product.

As soon as the pair of tape lengths are completely wound upon the winding forms, forming thereon bead cores such as that shown at 158 in Fig. 12, the cam roller 70 (Fig. 4) engages the cam lever 64 and through the cable 66 actuates the 4-way valve 117 to vent the upper end and charge the lower end of the cylinder 111 (Fig. 11) which moves the winding forms 97 and belt pulley members 121 away from the work retaining members 95, the annular face 134 of the rotating belt pulley member 121 abutting the annular wear plate 133 of the bearing 101 and thus causing the winding form 97 to pass entirely within the flange 120, forces the work from the winding form and permits it to drop from the winding device.

Before the succeeding lengths of tape reach the winding position the cam roller 70 (Fig. 4) passes out of engagement with the cam lever 64 and permits the spring 119 to reverse the valve 117 and cylinder 111 to restore the winding forms 97 to winding position, the winding form 97 coming again into frictional driving engagement with the still rotating work-retaining ring 95, and thus one cycle of the continuous operation is completed.

Different bridge members 89 carrying respective winding devices of suitable sizes are substituted for winding rings of different sizes and the speed of the continuous-strip feeding devices is modified, by adjustment of the change-gear and variable speed devices, to provide suitable severed lengths of the tapes.

Various modifications are possible within the scope of my invention as defined in the appended claims.

I claim:

1. The method of making tire-bead reinforcing rings which comprises constantly feeding a continuous strip of ring forming material, severing successive lengths from the leading end of the strip, stepping each severed length ahead of the succeeding length and feeding it to a winding position, and there winding the successive lengths into successive ring structures upon their arrival at the winding position.

2. A method as defined in claim 1 in which a plurality of the continuous strips are fed side-by-side in such proximity to each other as readily to be severed in a single severing operation common to the plurality of strips and in which equal lengths are simultaneously severed from the continuous strips.

3. Ring-forming apparatus comprising means for constantly feeding a continuous strip of ring-forming material, means for severing successive lengths from the leading end of the strip, means for stepping each severed length ahead of the succeeding length and feeding it to a winding position, and automatic receiving and winding means at the winding position for winding the successive lengths into successive ring structures.

4. Ring-forming apparatus as defined in claim 3 in which the strip-feeding means is so constructed and arranged as to feed a plurality of the continuous strips side-by-side in such proximity to each other as readily to be severed in a single severing operation common to the plurality of strips and including means for severing the plurality of strips in a single severing operation.

5. Ring-forming apparatus comprising means for feeding a plurality of continuous strips of ring-forming material side-by-side, means common to the strips for concurrently severing respective lengths from the leading ends of the strips, means for winding the severed lengths into respective rings, and means common to the lengths for feeding the severed lengths from the severing means to and automatically starting them in the winding means.

6. Apparatus as defined in claim 5 including means for projecting the leading end of the severed length into the winding means and means for effecting driving engagement between the winding means and the said length.

7. Ring forming apparatus comprising a rotatable winding form, a rotatable work-retaining member journaled coaxially with relation to the winding form but completely separable therefrom by relative axial movement to permit the passage from between the two of a ring wound upon and slid axially from the winding form, and a presser roller formed with a flange portion adapted to press the work against the winding form and with a hub portion adapted to run upon the work-retaining member when said member and the form are separated, to hold the presser roller out of the form's path of relative axial movement.

8. Ring-forming apparatus comprising means for feeding a continuous strip of ring-forming material, means for severing successive lengths from the leading end thereof, a winding form, means for driving the same, means for feeding the severed lengths from the severing means to the winding form, means for dislodging from the winding form a ring structure wound thereon, and means timed with the severing means for actuating the said dislodging means.

9. Apparatus as defined in claim 8 in which the means for feeding the severed lengths from the severing means to the winding form comprises an endless belt formed with a groove to receive the strip and means for retaining the said length in the groove.

10. Ring-forming apparatus comprising means for feeding a continuous length of ring-forming material, means for severing successive lengths from the leading end of the strip, a winding form, means for feeding the severed lengths from the severing means to the winding form, and means for driving the winding form at a greater peripheral speed than the speed of the length-feeding means, the length-feeding means being so constructed and arranged as to permit the length fed thereby to be drawn forward therefrom at the peripheral speed of the winding form.

11. Apparatus as defined in claim 10 including means for driving the continuous-strip feeding means at a slower speed than that of the severed-length feeding means.

12. Ring-forming apparatus comprising a winding form, means for driving the same, means for dislodging therefrom successive ring structures wound thereon, and means timed with the dislodging means for introducing successive lengths of ring-forming material to the winding form.

In witness whereof I have hereunto set my hand this 14th day of July, 1927.

FRANK SLUSHER.